(12) United States Patent
Marti (10) Patent No.: US 8,994,650 B2
(45) Date of Patent: Mar. 31, 2015

(54) PROCESSING IMAGE INPUT TO COMMUNICATE A COMMAND TO A REMOTE DISPLAY DEVICE

(75) Inventor: Stefan J. Marti, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 199 days.

(21) Appl. No.: 13/458,507

(22) Filed: Apr. 27, 2012

(65) Prior Publication Data
US 2013/0285894 A1    Oct. 31, 2013

(51) Int. Cl.
*G09G 5/00* (2006.01)
*G06F 3/041* (2006.01)
*G06F 3/00* (2006.01)
*G06F 3/01* (2006.01)
*G06F 3/0484* (2013.01)
*G06K 9/00* (2006.01)

(52) U.S. Cl.
CPC ............ *G06F 3/005* (2013.01); *G06F 3/017* (2013.01); *G06F 3/0484* (2013.01); *G06K 9/00355* (2013.01)
USPC .......................................... 345/156; 345/178

(58) Field of Classification Search
USPC .................................................. 345/173, 178
See application file for complete search history.

(56) References Cited

U.S. PATENT DOCUMENTS

| | | |
|---|---|---|
| 2009/0027337 A1 | 1/2009 | Hildreth |
| 2009/0077504 A1 | 3/2009 | Bell et al. |
| 2009/0109183 A1 | 4/2009 | Carvajal et al. |
| 2009/0178011 A1 | 7/2009 | Ording et al. |
| 2010/0149090 A1 | 6/2010 | Morris et al. |
| 2011/0057875 A1 | 3/2011 | Shigeta et al. |
| 2011/0115932 A1* | 5/2011 | Shin et al. .................. 348/211.4 |
| 2011/0187679 A1 | 8/2011 | Ko |
| 2012/0009914 A1* | 1/2012 | Lee et al. ....................... 455/420 |
| 2013/0143528 A1* | 6/2013 | Randazzo et al. ............ 455/411 |

* cited by examiner

*Primary Examiner* — Michael Faragalla
(74) *Attorney, Agent, or Firm* — Mahamedi Paradice LLP (57) ABSTRACT

A method is disclosed for operating a mobile device. The method is performed by one or more processors of the mobile device. The one or more processors process image input on the mobile device in order to detect one or more graphic objects displayed on a remote display device and to detect one or more fingers of a user in relation to the one or more graphic objects. From processing the image input, a command for the remote display device is determined based on a position or movement of the one or more fingers in relation to the one or more graphic objects. The command is communicated to the remote display device.

20 Claims, 7 Drawing Sheets

PROCESSING IMAGE INPUT TO COMMUNICATE A COMMAND TO A REMOTE DISPLAY DEVICE

BACKGROUND

Display devices, such as televisions, have become more advanced in recent years. For example, televisions have become more energy efficient and have higher resolution displays. Some televisions even include processing resources and network connectivity for providing features other than television programming.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein include a mobile computing device that is configured to utilize its image capturing capabilities to capture and interpret a user's gesture input with respect to features of another device. More specifically, some embodiments include a device that utilizes image input that captures a visual (or image-based) interaction between a user's fingers or hand and another remote device, such a portion of the remote display device. In this environment, one or more embodiments include a device that can detect and interpret a user gesture provided through an image capture medium in relation to another device. Such user gestures can be interpreted and used to command the remote device in a variety of ways.

In some embodiments, the mobile device can process image input to detect a graphic object(s) that is displayed on the remote display device. The mobile device can process image input to detect one or more fingers of a user in relation to the graphic object(s). The image input can be provided using one or more image capturing components of the mobile device.

According to an embodiment, based on the processing, the mobile device can determine a command for controlling the remote display device. The command can be based on a position or a movement of the user's finger(s) in relation to the graphic object. For example, the mobile device can detect that the user's finger(s) is manipulating the graphic object.

In another embodiment, the mobile device can present an image corresponding to the image input on a display screen of the mobile device. The image can include a portion of the user's hand or fingers. The mobile device can adjust or alter the image of the user's hand or fingers so that the view of the remote display device is less obstructed by the user's hand or fingers (from the perspective of a user looking at the display screen of the mobile device).

According to embodiments, the mobile device can process image input on the mobile device in order to detect one or more graphic objects that are displayed on a remote display device and to detect one or more fingers of a user in relation to the one or more graphic objects. From processing the image input, the mobile device can determine one or more commands for the remote display device based on a position or movement of the user's finger(s) in relation to the one or more graphic objects. The command is communicated to the remote display device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
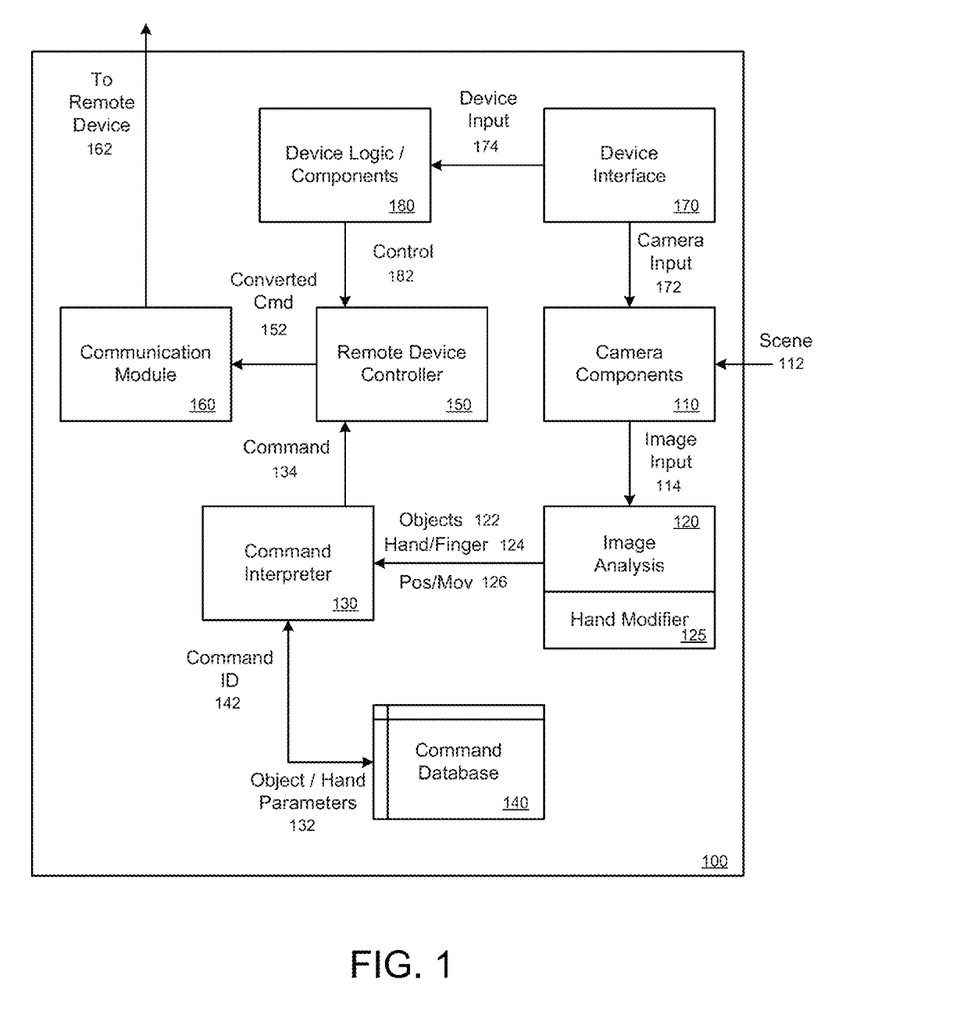
FIG. 1 illustrates an example device for controlling a remote display device, under an embodiment.

FIG. 1 illustrates an example device for controlling a remote display device, under an embodiment. A device such as described with respect to FIG. 1 can be implemented on, for example, a mobile multi-functional device (e.g., cellular messaging/telephony device), tablet or portable computing device having image capture capabilities. Still further, device 100 can include a remote control, a digital camera or other small-form factor device, that can be operated to capture images that include the user's own hand or fingers.

According to an embodiment, device 100 can process image input in order to control a remote display device. The remote display device can be a computing device with a display screen. The remote display device can include or be coupled to a communication module that enables wireless communications with other devices. For example, a remote display device can be a personal computer, or a television (e.g., a smart TV, or a TV coupled to a computing device, such as a video game console or video player).

According to one or more embodiments, the mobile device 100 includes camera components 110, image analysis 120, command interpreter 130, command database 140, remote device controller 150, communication module 160, device interface 170, and device logic/components 180. The components of mobile device 100 combine to process image input to detect graphic objects displayed on a remote display device and to detect one or more fingers of a user. By processing the image input, mobile device 100 can determine a command based on a position or movement of the user's finger relative to the graphic objects, and communicate the command to the remote display device.

The camera components 110 can be used for detecting a scene 112 and for providing a corresponding image input 114 to the image analysis 120. The camera components 110 can include, for example, a lens and other components of the image capturing device (e.g., filter, image sensor). The camera components 110 can receive and detect light from a scene 112 (e.g., whatever view and/or object(s) the lens is pointing at) and provide an image input 114 to the image analysis 120 in real-time. In one embodiment, a user of the mobile device 100 can capture an image of the scene 112 by pressing down on a capture button or trigger, or by using another user interface feature 170 (e.g., tap a "capture image" graphic feature provided on a touch-sensitive display).

In some embodiments, the mobile device 100 can operate in different modes of operation. For example, the mobile device 100 can be operated in a standard image capturing mode (including a video capture mode), in which the user can capture one or more images of a scene 112 by pressing a capture button or trigger. The mobile device 100 can also be operated in a remote device controlling mode. The user can switch between the different modes by providing input using the device interface 170 (via one or more input mechanisms (e.g., buttons and/or touch-sensitive display)).

When the mobile device 100 is operating in the remote device controlling mode, the camera components 110 can provide image input 114 to the image analysis 120 for processing. The image analysis 120 processes the image input 114 to detect object(s) 122 and to detect the user's hand/finger(s) 124. In one embodiment, the image analysis 120 can process the image input 114 using an image recognition application or software, or other image processing methods in order to detect the object(s) 122 and the user's hand/fingers(s) 124.

The image analysis 120 can also analyze the input image to detect characteristics that are indicative of the graphic object(s) 122 displayed on the remote display device and the user's hand/fingers(s) 124. For example, the image analysis 120 can search for a glare from a screen (e.g., an object emitting light), in which the graphic object(s) 122 would be presented on. Other characteristics can include a rectangular or angular border around a glare from the screen to indicate the frame and/or the location of the remote display device. The graphic object(s) 122 themselves can also be separated from one another by lines or spaces, have similar shapes (e.g., rectangular), be located in a particular region of the screen, or have some other indicators that the image analysis 120 can use to detect the graphic object(s) 122.

In many embodiments, image analysis 120 stores (or accesses stored) templates that correspond to graphic objects or graphic layouts that are possible from the remote device. The image analysis component 120 can utilize shapes specified by individual templates to detect objects of interaction on the remote device.

Still further, the image analysis 120 can detect other image characteristics of display objects, such as color, relevant brightness versus surrounding objects etc. In some embodiments, the image analysis 120 detects objects independently of the user's finger or hand placement or movement. In variations, the image analysis 120 can detect objects of interaction on the remote device based on (i) detecting the user's finger or hand, and (ii) analyzing a portion of a captured image near or between the fingers/hand to detect the presence of objects of potential interaction.

Similarly, the image analysis 120 can analyze the input image for characteristics that are indicative of the user's hand/finger(s) 124. For example, a user's hand/finger(s) 124 would be much closer to the camera components 110 (e.g., the lens) so that the image analysis 120 can detect that the object that is close to the lens is the user's hand/finger(s) 124 instead of a graphic object 122. Other characteristics can include features, such as skin color, distinctive features (e.g., finger nails, etc.), as well as movement of fingers or hands, etc. In some embodiments, the image analysis 120 can also use information detected from other sensors of the mobile device 100 to detect graphic object(s) 122 and the user's hand/finger(s) 124 (e.g., proximity sensor, depth sensor, imagers).

In other embodiments, the image analysis 120 can also receive graphic object information from the remote display device via the communication module 160. A wireless connection between the remote display device and the mobile device 100 can be established so that data can be exchanged between the devices (e.g., via Bluetooth, Wi-Fi). The remote display device can transmit graphic object information to the image analysis 120 so that the image analysis 120 can use the information to better detect the graphic object(s) 122 that are displayed on the display screen of the remote display device (and to detect the position/movement 126 of the user's hand/fingers 124 in relation to the graphic objects 122).

For example, the graphic object information can include what objects are being presented on the remote display device, the arrangement of the objects, the location of the objects on the remote display device, the contents of the objects, and what the objects represent (e.g., what would occur when the object is selected). The image analysis 120 can use this information to perform a compare operation of the image input 114 with the graphic object information to better synchronize and detect the user's gestures in relation to the graphic object(s) 122.

The image analysis 120 determines the position and/or the movement 126 of the user's hand/finger(s) 124 in relation to the one or more graphic object(s) 122. The position and/or the movement 126 of the user's hand/finger(s) 124 relative to the graphic object(s) 122 can be used to provide a control to the remote display device. The position and/or the movement 126 corresponds to a gesture the user can make with his or her hand. For example, the gesture can include (using one or more fingers or a hand) a pinching movement, an expanding movement (moving fingers away from each other), a swiping movement, a flicking movement, a rotating movement, etc., that can have different speeds or magnitudes depending on the severity of the movements.

The image analysis 120 provides information about the detected object(s) 122, the user's hand/finger(s) 124, and the position and movement 126 of the user's hand/finger(s) 124 in relation to the object(s) 122 to the command interpreter 130. The command interpreter 130 uses the received information to provide object and hand parameters 132 to the command database 140. The object and hand parameters 132 can correspond to the position and/or movement of the user's fingers in relation to the graphic objects. Using the parameters 132, the command interpreter 130 can retrieve (or receive) a command identifier (ID) 142 from the command database 140.

In some embodiments, the command database 140 can include entries that each associate parameters 132 to command IDs 142. For example, an entry can associate the user's pinching motion on a graphic object displayed on the remote display device as being equivalent to a selection command. The command database 140 can be stored remotely or locally in a memory resource of the mobile device 100.

The command interpreter 130 receives the command ID 142 that pertains or corresponds to the particular object and hand parameters 132, and provides a command 134 to the remote device controller 150. The remote device controller 150 can convert the command 134 to be in a format that can be transmitted to the remote display device. For example, the user may have two or more remote display devices that are manufactured by different manufacturers. The remote device controller 150 can convert the command 134 into a converted command 152 that corresponds to the particular remote display device. In another embodiment, the command interpreter 130 can perform the conversion without having to provide the command 134 to a remote device controller 150 (e.g., the command interpreter 130 can identify the remote display device and format the command 134 to be tailored to the particular remote display device).

The remote device controller 150 provides the converted command 152 to the communication module 160, so that a command can be communicated (wirelessly) 162 to the remote display device. The command can cause a function or operation to be performed by the remote display device.

The mobile device 100 also includes the device logic 180. The device logic 180 can receive device input 174 from the device interface 170 (e.g., one or more input mechanisms, a touch-sensitive display screen, microphone). The device logic 180 can interpret the inputs 174 provided by a user in order to perform additional operations on the mobile device 100. For example, in addition to converting a command 134 that corresponds to the position or movement of the user's fingers in relation to the graphic objects, the remote device controller 150 can also convert user controls 182 that are provided on the device interface 170. The user controls 182 can pertain to other operations that can be performed while the mobile device 100 is processing image input and communicating a command to the remote display device. The user may, for example, press a button to cause another command to be transmitted concurrently to the remote display device, or cause a separate operation to be performed on the mobile device 100 (e.g., capture an image of the scene, change a setting or operation modes).

According to some embodiments, the image analysis 120 also includes hand modifier 125. The hand modifier 125 can perform image processing methods to adjust the image that is displayed on a display screen of the mobile device 100. For example, an image can be displayed on the display screen that corresponds to the image input and include at least a portion of the user's hand. From the perspective of the user, the portion of the user's hand/fingers can obstruct the view of the display screen of the remote display device (and subsequently, obstruct the view of one or more graphic objects). The hand modifier 125 can modify the displayed image to alleviate the obstruction caused by the user's hand.

The hand modifier 125 can use the information regarding the detected hand/finger(s) 124 and adjust the image of the user's hand. In one embodiment, the hand modifier 125 can use image processing operations to erase the user's hand(s) (and/or arm(s)) and replace it with suitable image data in place of the user's hand. The image data necessary to fill in the location of the user's hand can be obtained by storing image input detected by the camera components 110 in a buffer or memory (e.g., a few seconds of streaming images or video). This image data can contain the scene just before the hand obstructed it. Using feature tracking, the image data (e.g., background data without the user's hand) can be mapped to the current live view or image input 144.

In another embodiment, the hand modifier 125 can receive, from the remote display device, information about the interface features that are presented on the display screen of the remote display device (e.g., as discussed above, the information can include graphic object information). The information about the features that are presented on the display screen of the remote display device can be mapped to the current live view or image input 144 to fill in the location of the user's hand. In other embodiments, using these image processing techniques, the hand modifier 125 can also render an adjusted image of the user's hand after erasing the user's hand. The hand modifier 125 can make the user's hand partially transparent, overlay a different view of the hand (e.g., a robotic hand, a gloved hand), or create a more abstracted and less detailed hand.

In some embodiments, some of the components that are described in mobile device 100 can be provided as being individual components or as being part of the same component. For example, the image analysis 120 and the command interpreter 130 can be provided as part of the same component. In another example, the command interpreter 130 and the remote device controller 150 can be provided as part of the same component. In another embodiment, the components that are described in mobile device 100 can be provided as part of the device operating system or as part of one of more applications. Logic can be implemented with various applications (e.g., software) and/or with hardware of the mobile device 100.

Methodology

Figure 2:
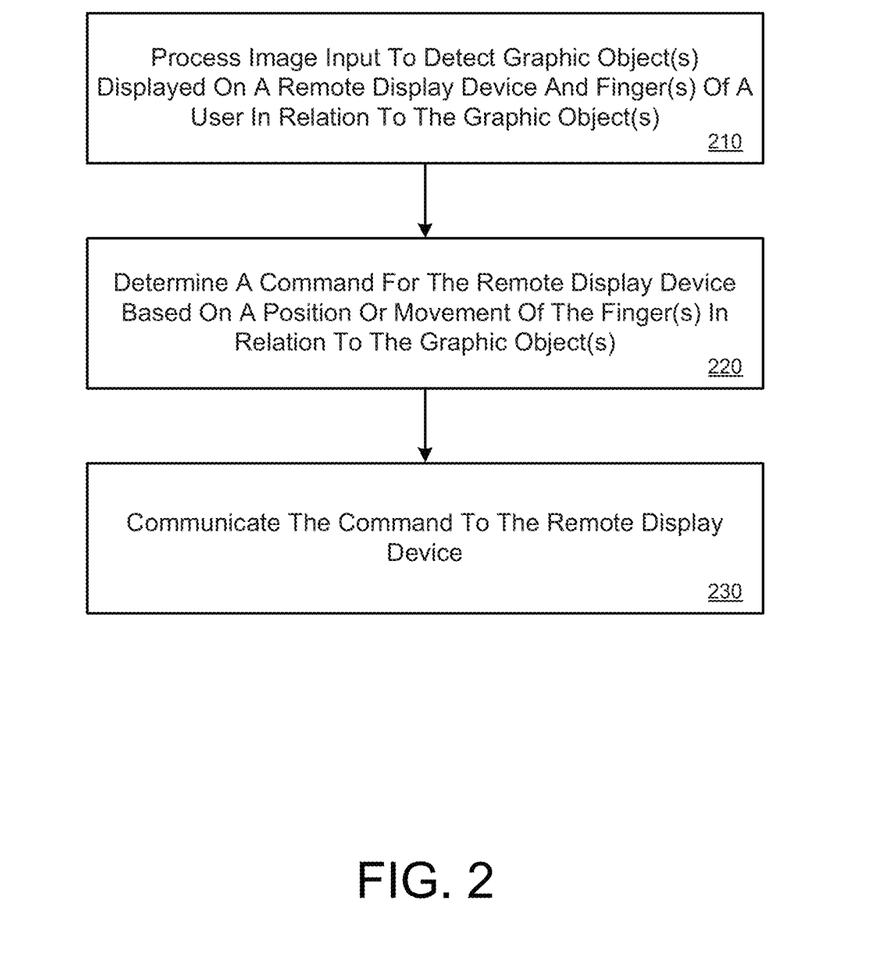
FIG. 2 illustrates an example method for controlling a remote display device, according to an embodiment.

FIG. 2 illustrates an example method for controlling a remote display device using a mobile device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

Image input on the mobile device can be processed in order to detect one or more graphic objects displayed on a remote display device and to detect the user's one or more fingers in relation to the one or more graphic objects (step 210). The mobile device can perform various image processing operations in order to detect the graphic objects and the user's fingers. The position and/or movement of the fingers can also be detected from processing the image input.

In some embodiments, an image of the current scene (e.g., corresponding to the image input) can be displayed on a display screen of the mobile device. In this way, the user can see the display screen and see where the objects are relative to her fingers. In one embodiment, the image can be altered to erase or modify the image of the user's hand/fingers.

From processing the image input, a command for the remote display device can be determined based on the position and/or movement of the user's fingers in relation to the graphic objects (step 220). The mobile device can determine from the position and/or the movement of the user's fingers a command that the user is trying to perform. The position and/or the movement can correspond to a gesture that can include a pinching movement, an expanding movement (moving fingers away from each other), a swiping movement, a flicking movement, a rotating movement, etc. The determined command can be communicated to the remote display device (step 230).

In some embodiments, the method such as described by an embodiment of FIG. 2 can be implemented after a wireless connection is established between the mobile device and the remote display device. In other embodiments, a wireless connection between the devices can be established when the command is determined based on the position or movement of the user's fingers in relation to the graphic object, or when the command is to be communicated to the remote display device.

Figure 3A:
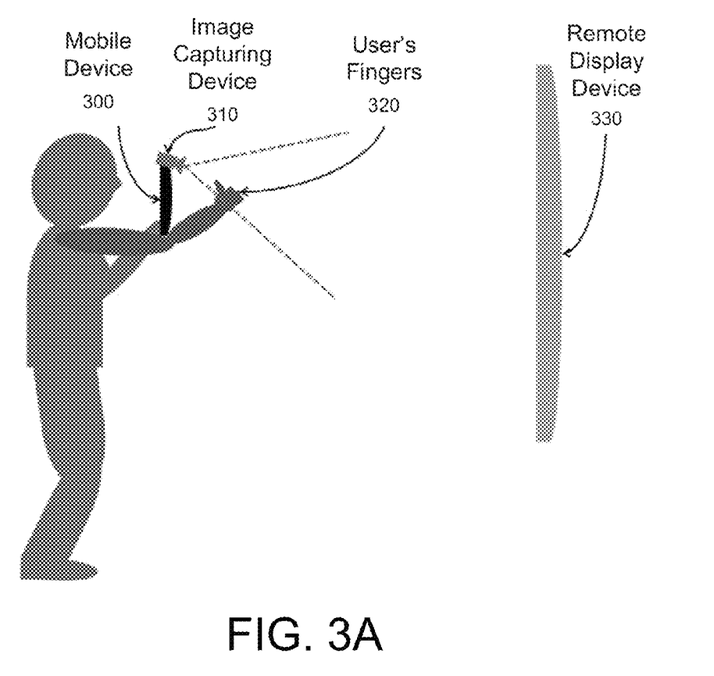
FIGS. 3A-3B illustrate an example scenario of a user operating a computing device, under an embodiment.
Figure 3B:
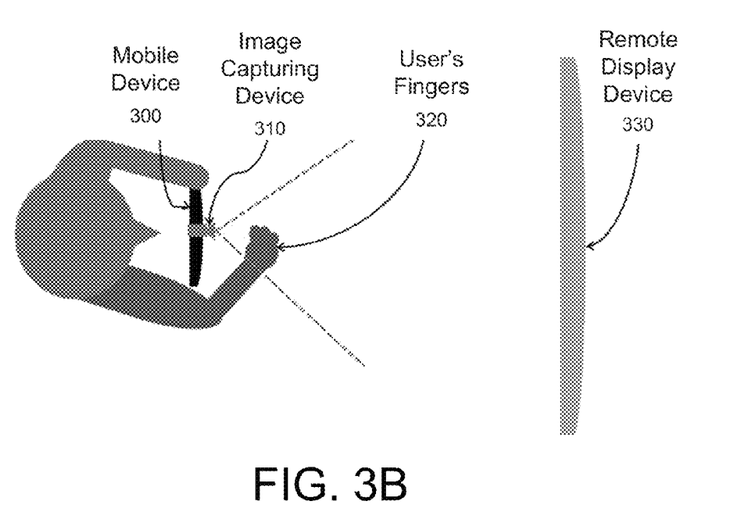

FIGS. 3A-3B illustrate an example scenario of a user operating a computing device, under an embodiment. In particular, FIG. 3A illustrates a user operating the mobile device from a side view, and FIG. 3B illustrates the user operating the mobile device from a top view. The user is standing in front of the remote display device 330 (e.g., a smart TV) and holding the mobile device 300 with his left hand up to his eye level (e.g., like looking through a glass). The user is performing hand gestures using his right fingers 320 behind the mobile device (from the user's perspective) but in front of the image capturing device 310.

The remote display device 330 can present on its display screen one or more graphic objects that can be manipulated by the user (using the mobile device 300). Because the user is holding the mobile device 300 in front of the remote display device 300, the image capturing device 310 can receive image input of at least a portion of the remote display device 330 (as well as one or more graphic objects displayed on the display screen of the remote display device 300) and the user's fingers 320. The mobile device 300 can process the image input in order to detect which graphic object is being manipulated by the user's fingers 320 and provide a command to the remote display device 300.

Figure 4:
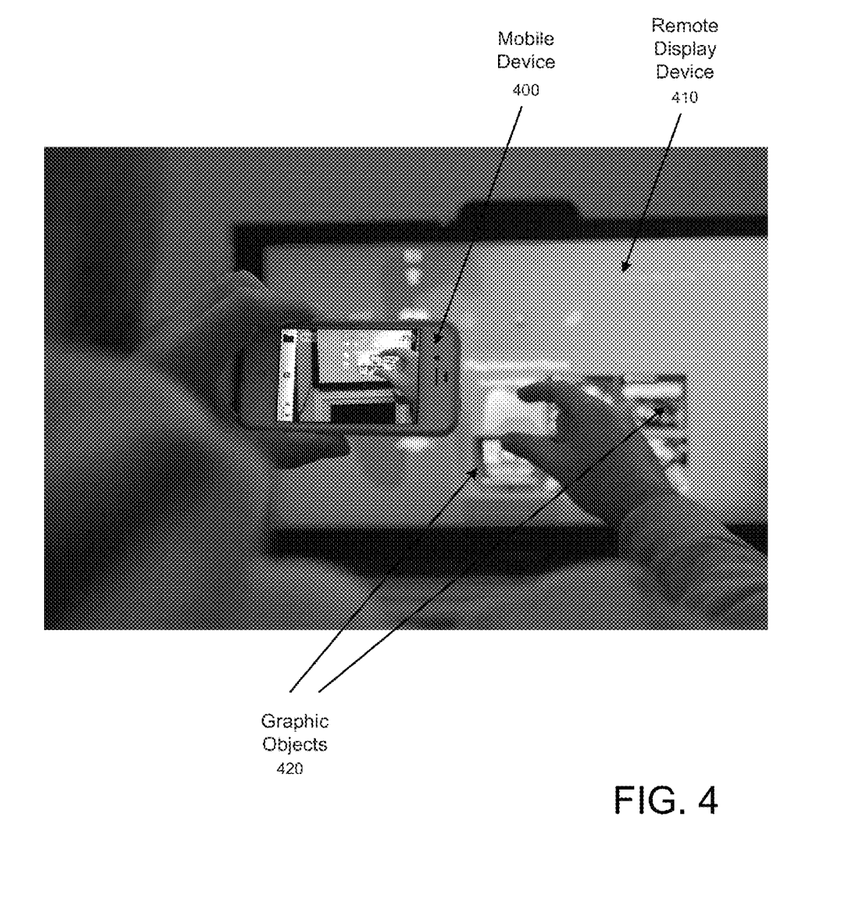
FIG. 4 illustrates an example scenario of a user operating a computing device, according to an embodiment.

FIG. 4 illustrates an example scenario of a user operating a computing device, according to an embodiment. FIG. 4 provides an example of the user operating the mobile device 400 from a view that is closer to the user's perspective. The display screen of the mobile device 400 presents an image of the scene that is captured by the image capturing components of the mobile device 400. The scene includes a portion of the remote display device 410, a portion of the display screen of the remote display device 410, and graphic objects 420 provided on the display screen.

The user can operate the mobile device 400 to interact with the graphic objects 420 that are displayed on the display screen of the remote display device 410. The mobile device 400 can process the image input (e.g., corresponding to the current scene) to detect the one or more graphic objects 420 and to detect one or more fingers of a user in relation to the one or more graphic objects 420. From processing the image input, the mobile device 400 can determine a command for the remote display device 410 based on a position or movement of the user's fingers in relation to one of the graphic objects. In this case, a positioning of the user's fingers on two sides of the graphic object (e.g., the top and bottom sides of the rectangular shaped graphic object) can correspond to the user selecting the graphic object. The determined command can then be communicated to the remote display device 410 using a wireless connection (e.g., via Bluetooth or Wi-Fi).

Figure 5:
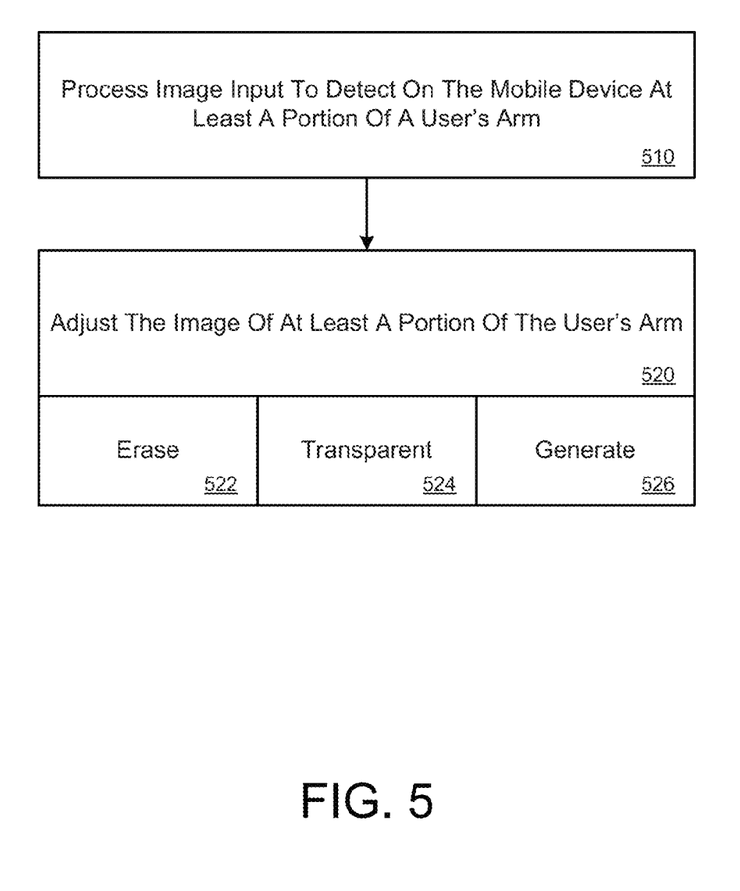
FIG. 5 illustrates an example method for adjusting an image on a mobile device, according to an embodiment.

FIG. 5 illustrates an example method for adjusting an image on a mobile device, according to an embodiment. A method such as described by an embodiment of FIG. 5 can be implemented using, for example, components described with an embodiment of FIG. 1. Accordingly, references made to elements of FIG. 1 are for purposes of illustrating a suitable element or component for performing a step or sub-step being described. In some embodiments, the method as described by an embodiment of FIG. 5 can be implemented concurrently with the method described by an embodiment of FIG. 2.

When the mobile device receives image input from its image capturing components, an image corresponding to the image input can be displayed on the display screen of the mobile device. From the perspective of a user, the portion of the user's hand/fingers that are also captured by the image capturing components can obstruct the view of the remote display device (and subsequently, obstruct the view of one or more graphic objects). The image of the user's hand or arm can be modified to alleviate the obstruction.

Image input on the mobile device can be processed in order to detect at least a portion of the user's arm or hand (step 510). The user's arm or hand can be detected by operating image recognition software or applications (e.g., detect characteristics from the image input that is indicative of the user's arm or hand).

Based on the information corresponding to the detected portion of the user's arm or hand, the image of the user's arm or hand can be automatically adjusted (step 520). In one embodiment, image processing operations can be performed to erase the user's arm or hand (sub-step 522), or replace it with suitable image data in place of the user's hand. The suitable image data is image data necessary to fill in the location of the user's hand. This image data can be obtained by storing image input detected by the image capturing components in a buffer or memory (e.g., a few seconds of streaming images or video). The image data can contain a view of the scene (including the remote display device) just before the user's hand obstructed it. Using feature tracking, the image data (e.g., background data without the user's hand) can be mapped to the image input.

In another embodiment, information about the interface features that are presented on the display screen of the remote display device can be received from the remote display device. The information about the features can be mapped to the image input to fill in the location of the user's hand or arm. Using image processing techniques, an adjusted image of the user's hand or arm can be rendered in place of the user's actual hand or arm. For example, the user's arm or hand can be modified to be partially transparent or transparent (sub-step 524), to be thinner than normal, to be a computer generated arm or hand (sub-step 526), or to be a hand with less features.

Figure 6:
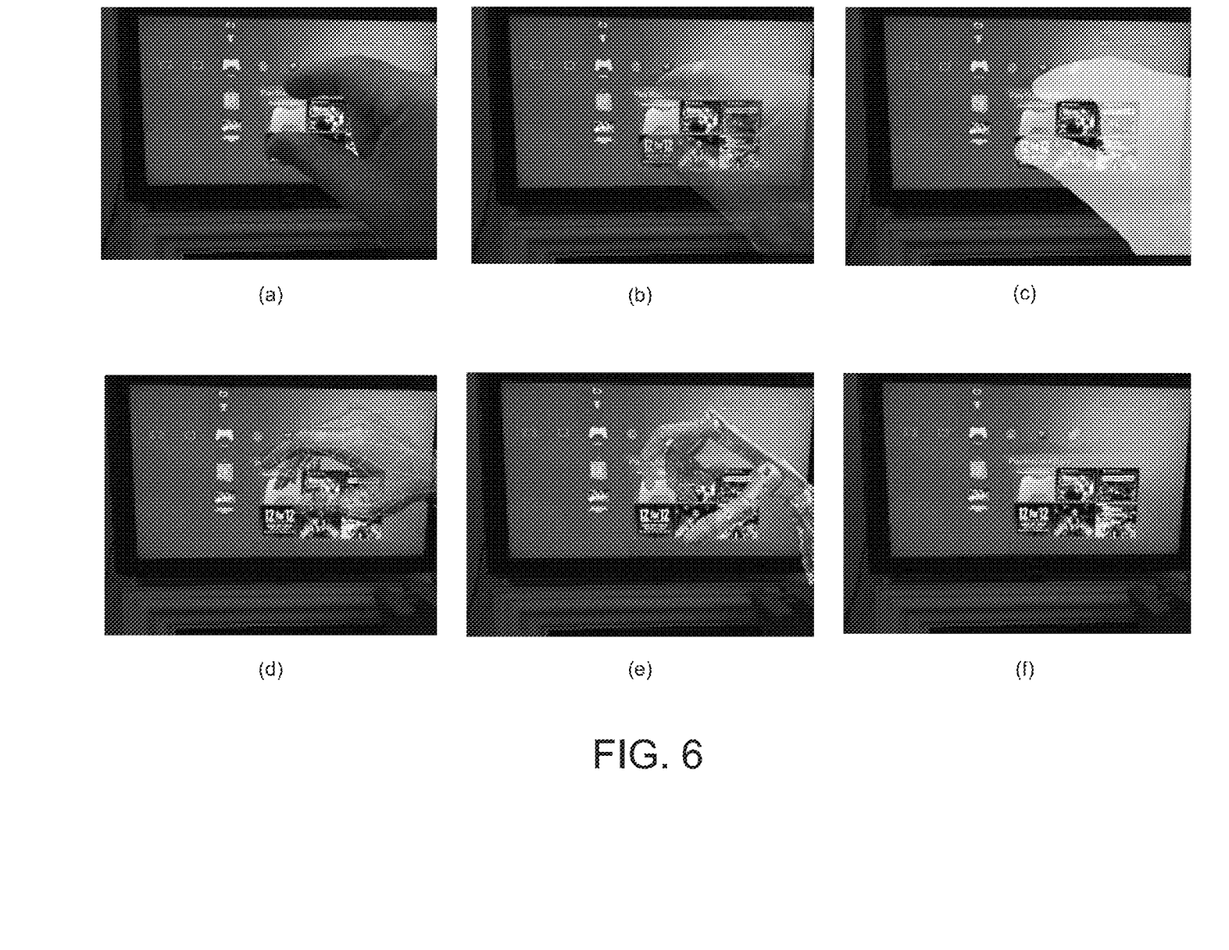
FIG. 6 illustrates example adjustments of an image performed on a mobile device, under another embodiment.

FIG. 6 illustrates example adjustments of an image performed on a mobile device, under another embodiment. The images (a)-(f) illustrated in FIG. 6 correspond to images that are presented on a display screen of the mobile device when the mobile device is being operated by the user. In image (a), the user's right hand is partially obstructing the display screen of the remote display device. In image (a), no adjustment is made to the image of the user's hand.

In image (b), the mobile device has performed an adjustment by making the user's hand partially transparent. In this case, the user can still see the graphic objects that would have been obstructed, but still see his or her hand on the display screen. In image (c), the mobile device has adjusted the user's hand to remove texture and coloration (and also partially transparent).

In images (d) and (e), computer generated renderings of the user's hand is provided. Image (d) is of a mesh computer generated hand, while image (e) is of a computer generated robotic hand. Other types of adjustments are possible (e.g., instead of a hand, a cursor, such as a box or an arrow can be displayed). Image (f) illustrates the user's hand being erased and no further renderings being made in place of the user's hand.

In some embodiments, the user can configure the mobile device to select a particular type of adjustment (e.g., the user can choose to have her hand be modified to be partially transparent, as shown in image (b) instead of being modified to be a robotic hand, as shown in image (e)).

Hardware Diagram

Figure 7:
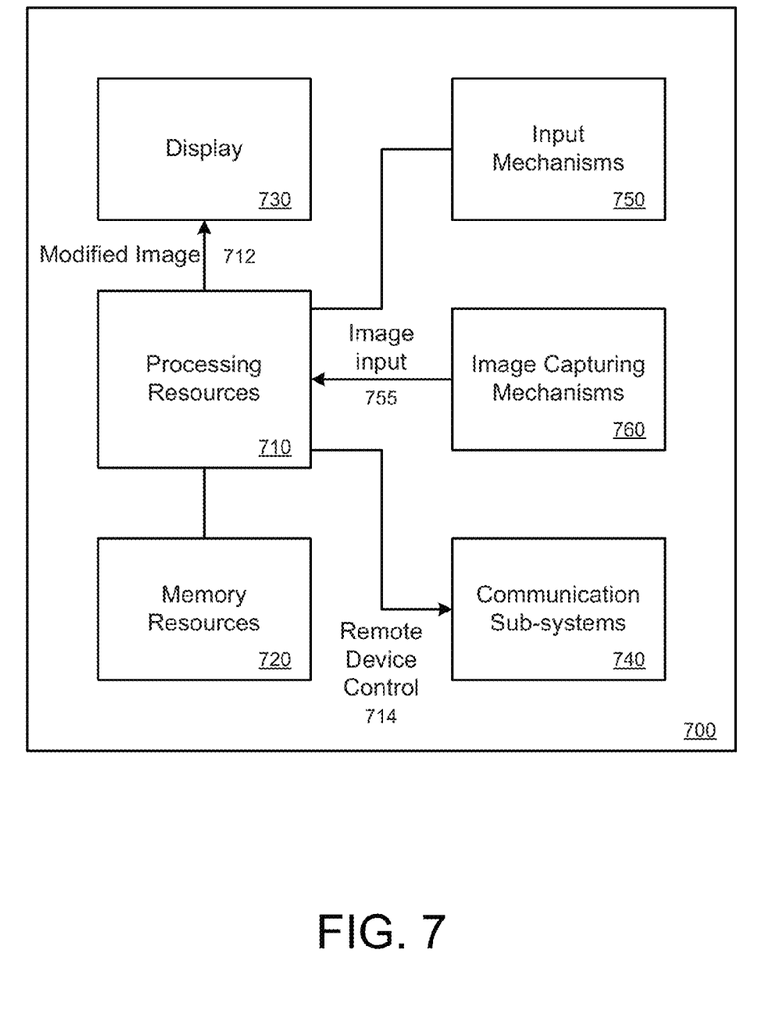
FIG. 7 illustrates an example hardware diagram for a system for operating a mobile device, under an embodiment.

FIG. 7 illustrates an example hardware diagram of a computer system upon which embodiments described herein may be implemented. For example, in the context of FIG. 1, the device 100 may be implemented using a computer system such as described by FIG. 7. In one embodiment, a computing device 700 may correspond to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 700 includes processing resources (e.g., one or more processors) 710, memory resources 720, a display device 730, one or more communication sub-systems 740 (including wireless communication sub-systems), input mechanisms 750, and image capturing components 760. In one embodiment, at least one of the communication sub-systems 740 sends and receives cellular data over data channels and voice channels.

The processing resources 710 are configured with software and/or other logic to perform one or more processes, steps and other functions described with embodiments, such as described by FIGS. 1-6, and elsewhere in the application. The processing resources 710 are configured, with instructions and data stored in the memory resources 720, to implement the device 100 (as described with FIG. 1). For example, instructions for implementing some of the components of FIG. 1 can be stored in the memory resources 720 of the computing device 700. The processing resources 710 can execute instructions for operating the mobile device and for communicating commands to a remote display device (via the communications sub-systems 740). The processing resources 710 can receive an image input 755 from the image capturing mechanisms 760, process the image input and provide a remote display device control 714 to the communication sub-systems 740. The processing resources 710 can also provide a modified image 712 (e.g., a modified image of a user's hand or fingers) to be presented on the display 730.

Alternative Embodiments

In an alternative embodiment, the mobile device can receive (via a wireless connection), interface information from the remote display device. The interface information corresponds to the interface (including graphic objects) that are provided on the display screen of the remote display device. The mobile device can use the interface information to render the displayed interface of the remote display device on a display screen of the mobile device. This enables the user to provide a command to the remote display device by manipulating one or more graphic objects on the display screen of the mobile device (e.g., by tapping on the touch-sensitive display screen of the mobile device).

For example, the user can tap on a graphic object that is displayed on the touch-sensitive display of the mobile device. The graphic object provided on the display of the mobile device can correspond to a similar object that is displayed on the display screen of the remote display device. When the user performs an action (e.g., a gesture) on the graphic object provided on the display of the mobile device, the mobile device can detect and interpret the gesture, and communicate a corresponding command to the remote display device.

In another embodiment, the image of the user's hand or arm can be adjusted by the mobile device by erasing the image of the arm or hand from the displayed image on the mobile device and/or by generating an image of a hand on the display screen of the remote display device. Information about the location of the user's hand with respect to the graphic objects can be transmitted to the remote display device. In this way, the user can hold the mobile device in front of her, with her hand in front of the image capturing device, e.g., as illustrated in FIGS. 3A-4, but look at the image of her hand on the display of the remote display device to select or manipulate a graphic object. The user would not have to look at the display screen of the mobile device to position her hands with respect to the graphic objects, but can look at the display screen of the remote display device to do so.

According to an embodiment, the processing resources 710 can provide content to the display 730 by executing instructions and/or applications that are stored in the memory resources 720. The content can include a preview image of a scene in which the lens of the image capturing device is pointed towards or focused on. The content can also be provided in response to a user operating a camera application or other applications (e.g., software for controlling a remote display device). In some embodiments, the processing resources 710 can execute and operate a variety of different applications and/or functionalities, such as, for example, a home page or start screen, an application launcher page, messaging applications (e.g., SMS messaging application, e-mail application, IM application), a phone application, game applications, calendar application, document application, web browser application, clock application, camera application, media viewing application (e.g., for videos, images, audio), social media applications, financial applications, and device settings.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a mobile device, the method being performed by one or more processors of the mobile device and comprising:
   receiving, from an image capturing component of the mobile device, image input corresponding to a scene, the scene including at least a portion of a remote device and one or more fingers of a user of the mobile device;
   processing the image input on the mobile device to (i) detect, in the image input, one or more graphic objects that are displayed on a display of the remote device, and (ii) detect, in the image input, the one or more fingers of the user in relation to the one or more graphic objects;
   determining, from processing the image input, a command for controlling an operation of the remote device based on a position or a movement of the one or more fingers in the image input in relation to the one or more graphic objects in the image input; and
   communicating, from the mobile device, the command to the remote device.

2. The method of claim 1, further comprising:
   establishing a wireless connection with the remote device, the wireless connection enabling exchange of data between the mobile device and the remote device.

3. The method of claim 2, further comprising:
   receiving, from the remote device, information corresponding to the one or more graphic objects displayed on the remote device using the wireless connection.

4. The method of claim 1, wherein determining the command includes accessing a database using information about the detected one or more graphic objects and the detected one or more fingers of the user.

5. The method of claim 1, further comprising:
   presenting, on a display of the mobile device, image content corresponding to the image input received from the image capturing component.

6. The method of claim 5, wherein presenting the image content corresponding to the image input includes altering at least an image of the one or more fingers of the user, or the user's hand or arm.

7. The method of claim 1, wherein the movement of the one or more fingers includes at least one of a pinching movement, an expanding movement, a swiping movement, a flicking movement, or a rotating movement.

8. A mobile computing device comprising:
   a camera;
   a display;
   a communication interface;
   a memory storing instructions; and
   one or more processors, coupled to the camera, the display, the communication interface, and the memory, the one or more processors to execute the instructions, wherein the instructions, when executed, cause the mobile computing device to perform operations comprising:
      receiving, from the camera, image input corresponding to a scene, the scene including at least a portion of a remote device and one or more fingers of a user of the mobile computing device;
      processing the image input on the mobile computing device to (i) detect, in the image input, one or more graphic objects that are displayed on a display of the remote device, and (ii) detect, in the image input, the one or more fingers of the user in relation to the one or more graphic objects;
      determining, from processing the image input, a command for controlling an operation of the remote device based on a position or a movement of the one or more fingers in the image input in relation to the one or more graphic objects in the image input; and
      communicating the command to the remote device.

9. The mobile computing device of claim 8, wherein execution of the instructions causes the mobile computing device to further perform operations comprising:
   establishing a wireless connection with the remote device using the communication interface, the wireless connection enabling exchange of data between the mobile computing device and the remote device.

10. The mobile computing device of claim 9, wherein execution of the instructions causes the mobile computing device to further perform operations comprising:
    receiving, from the remote device, information corresponding to the one or more graphic objects displayed on the remote device using the wireless connection.

11. The mobile computing device of claim 8, wherein execution of the instructions causes the mobile computing device to determine the command by accessing a database using information about the detected one or more graphic objects and the detected one or more fingers of the user.

12. The mobile computing device of claim 8, wherein execution of the instructions causes the mobile computing device to further perform operations comprising:
    presenting, on the display of the mobile computing device, image content corresponding to the image input received from the camera.

13. The mobile computing device of claim 12, wherein execution of the instructions causes the mobile computing device to present the image content corresponding to the image input by altering at least an image of the one or more fingers of the user, or the user's hand or arm.

14. The mobile computing device of claim 8, wherein the movement of the one or more fingers includes at least one of a pinching movement, an expanding movement, a swiping movement, a flicking movement, or a rotating movement.

15. A non-transitory computer readable medium storing instructions that, when executed by one or more processors of a mobile computing device, cause the mobile computing device to perform operations comprising:
    receiving, from an image capturing component of the mobile computing device, image input corresponding to a scene, the scene including at least a portion of a remote device and one or more fingers of a user of the mobile computing device;
    processing the image input on the mobile computing device in order to (i) detect, in the image input, one or more graphic objects displayed on a display of the remote device, and (ii) detect, in the image input, the one or more fingers of the user in relation to the one or more graphic objects;
    determining, from processing the image input, a command for controlling an operation of the remote device based on a position or a movement of the one or more fingers in the image input in relation to the one or more graphic objects in the image input; and
    communicating the command to the remote device.

16. The non-transitory computer readable medium of claim 15, wherein execution of the instructions further causes the mobile computing device to perform operations comprising:

establishing a wireless connection with the remote device, the wireless connection enabling exchange of data between the mobile device and the remote device.

17. The non-transitory computer readable medium of claim 16, wherein execution of the instructions further causes the mobile computing device to perform operations comprising:
receiving, from the remote device, information corresponding to the one or more graphic objects displayed on the remote device using the wireless connection.

18. The non-transitory computer readable medium of claim 15, wherein execution of the instructions further causes the mobile computing device to perform operations comprising:
presenting, on a display of the mobile device, image content corresponding to the image input received from the image capturing component.

19. The non-transitory computer readable medium of claim 18, wherein execution of the instructions causes the mobile computing device to present the image content corresponding to the image input by altering at least an image of the one or more fingers of the user, or the user's hand or arm.

20. The non-transitory computer readable medium of claim 15, wherein the movement of the one or more fingers includes at least one of a pinching movement, an expanding movement, a swiping movement, a flicking movement, or a rotating movement.

* * * * *